(12) United States Patent
Hou et al.

(10) Patent No.: US 12,418,107 B2
(45) Date of Patent: Sep. 16, 2025

(54) SYSTEMS AND METHODS FOR GENERATING CALIBRATION DATA IN ACTIVE ANTENNA MODULES HAVING ANTENNA-SIDE FILTER ARRAYS THEREIN

(71) Applicant: Outdoor Wireless Networks LLC, Claremont, NC (US)

(72) Inventors: Xiaohua Hou, Richardson, TX (US); Calogero Armao, Milan (IT); Alessandro Sinicco, Monza (IT); Huan Wang, Richardson, TX (US)

(73) Assignee: Outdoor Wireless Networks LLC, Richardson, TX (US)

( * ) Notice: Subject to any disclaimer, the term of this patent is extended or adjusted under 35 U.S.C. 154(b) by 103 days.

(21) Appl. No.: 18/566,963

(22) PCT Filed: Jun. 3, 2022

(86) PCT No.: PCT/US2022/032149
§ 371 (c)(1),
(2) Date: Dec. 4, 2023

(87) PCT Pub. No.: WO2022/260949
PCT Pub. Date: Dec. 15, 2022

(65) Prior Publication Data
US 2024/0275041 A1 Aug. 15, 2024

(30) Foreign Application Priority Data
Jun. 8, 2021 (IT) .................... 102021000014927

(51) Int. Cl.
*H01Q 3/26* (2006.01)
*H01Q 1/24* (2006.01)
(Continued)

(52) U.S. Cl.
CPC ............ *H01Q 3/267* (2013.01); *H01Q 1/246* (2013.01); *H01Q 21/26* (2013.01); *H04B 17/14* (2015.01)

(58) Field of Classification Search
CPC ............ H01Q 1/24; H01Q 1/246; H01Q 1/50; H01Q 1/52; H01Q 5/50; H01Q 9/06;
(Continued)

(56) References Cited

U.S. PATENT DOCUMENTS 10,164,334 B2 * 12/2018 Kareisto .................. G01S 7/40
10,263,330 B2 *  4/2019 Martikkala ............ H01Q 21/00
(Continued)

FOREIGN PATENT DOCUMENTS

EP     1204161 A1    5/2002
EP     2270923 A1    1/2011
(Continued)

OTHER PUBLICATIONS

Italian Search Report Corresponding to Italian Application No. 102021000014927 (13 pages) (Mar. 2, 2022).
(Continued)

*Primary Examiner* — Tho G Phan
(74) *Attorney, Agent, or Firm* — Myers Bigel, P.A.

(57) ABSTRACT

A system for generating calibration data in an active antenna system (AAS) radio includes an array of directional couplers within a multi-channel transmit/receive signal path of the AAS radio, and a combiner network electrically coupled to the array of directional couplers. An array of filters is provided within the multi-channel transmit/receive signal path. The array of filters is electrically coupled to antenna-side terminals of the array of directional couplers. A plurality of pairs of transmitters and receivers are provided, which include a transmitter and a receiver that operate as a reference transmitter and a reference receiver, respectively. A
(Continued)

removable routing network is provided, which is electrically coupled to antenna-side terminals of the array of filters, and is configured to feed back factory calibration signals (generated by the AAS radio during factory calibration) to antenna-side terminals of the array of filters. A multi-stage switch network is provided, which is electrically coupled to the reference transmitter, the reference receiver, the combiner network, and a factory calibration port of the routing network.

19 Claims, 8 Drawing Sheets

(51) Int. Cl.
*H01Q 21/00* (2006.01)
*H01Q 21/26* (2006.01)
*H04B 7/06* (2006.01)
*H04B 17/12* (2015.01)
*H04B 17/14* (2015.01)

(58) Field of Classification Search
CPC ........ H01Q 21/00; H01Q 21/24; H01Q 21/26; H01Q 3/26; H01Q 3/267; H04B 1/00; H04B 1/40; H04B 17/12; H04B 17/14; H04B 17/21; H04B 7/06; H04B 7/0617
See application file for complete search history.

(56) References Cited

U.S. PATENT DOCUMENTS

| | | | |
|---|---|---|---|
| 10,910,711 B2 * | 2/2021 | Ananth | H04B 17/12 |
| 11,482,774 B2 | 10/2022 | Hou et al. | |
| 11,606,125 B2 * | 3/2023 | Aue | H04B 17/21 |
| 11,611,143 B2 | 3/2023 | Hou et al. | |
| 11,736,209 B1 * | 8/2023 | Bar Shalom | H04B 17/12 |
| | | | 455/63.4 |
| 11,837,789 B2 * | 12/2023 | Da Silveira | H01P 1/207 |
| 2015/0312018 A1 | 10/2015 | Li et al. | |
| 2017/0033454 A1 | 2/2017 | Van Bezooijen et al. | |
| 2019/0190152 A1 | 6/2019 | Doudou et al. | |

FOREIGN PATENT DOCUMENTS

| | | |
|---|---|---|
| EP | 2713436 A1 | 4/2014 |
| EP | 3544204 A2 | 9/2019 |
| WO | 9700586 A1 | 1/1997 |

OTHER PUBLICATIONS

Notification of Transmittal of the International Search Report and the Written Opinion of the International Searching Authority, or the Declaration, in corresponding PCT Application No. PCT/US2022/032149 (14 pages) (Sep. 27, 2022).

* cited by examiner

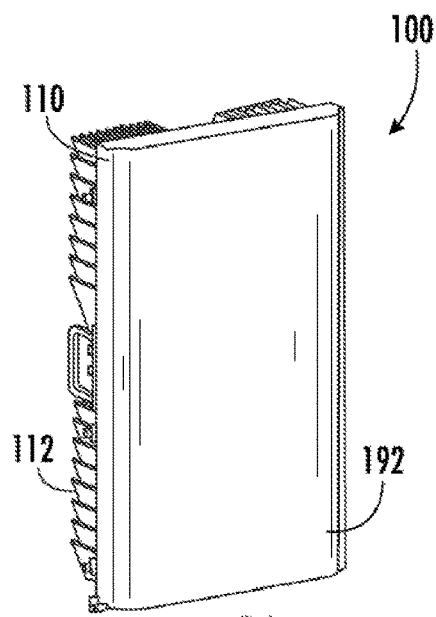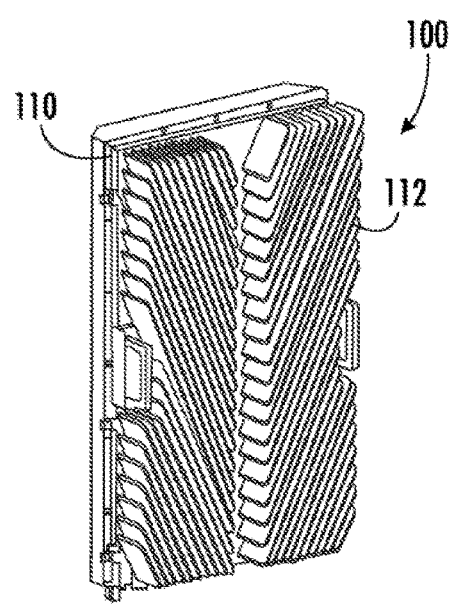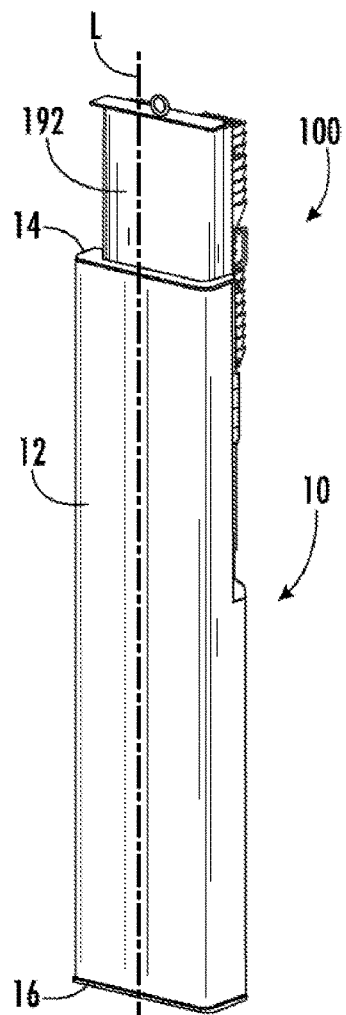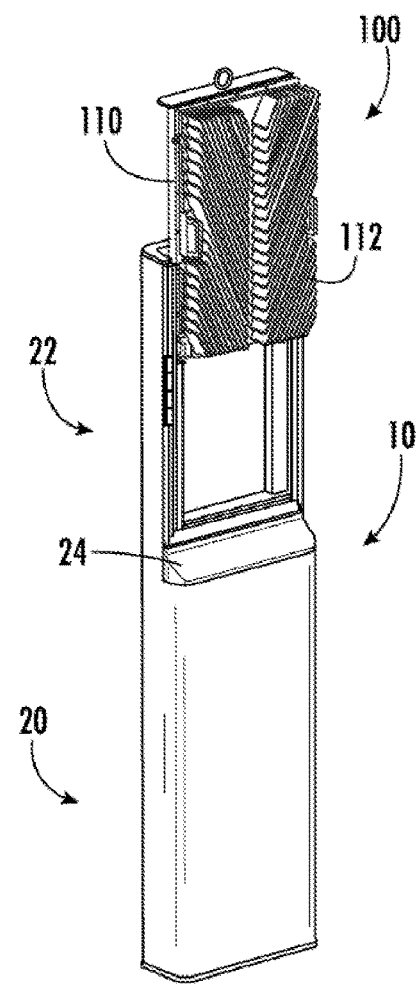

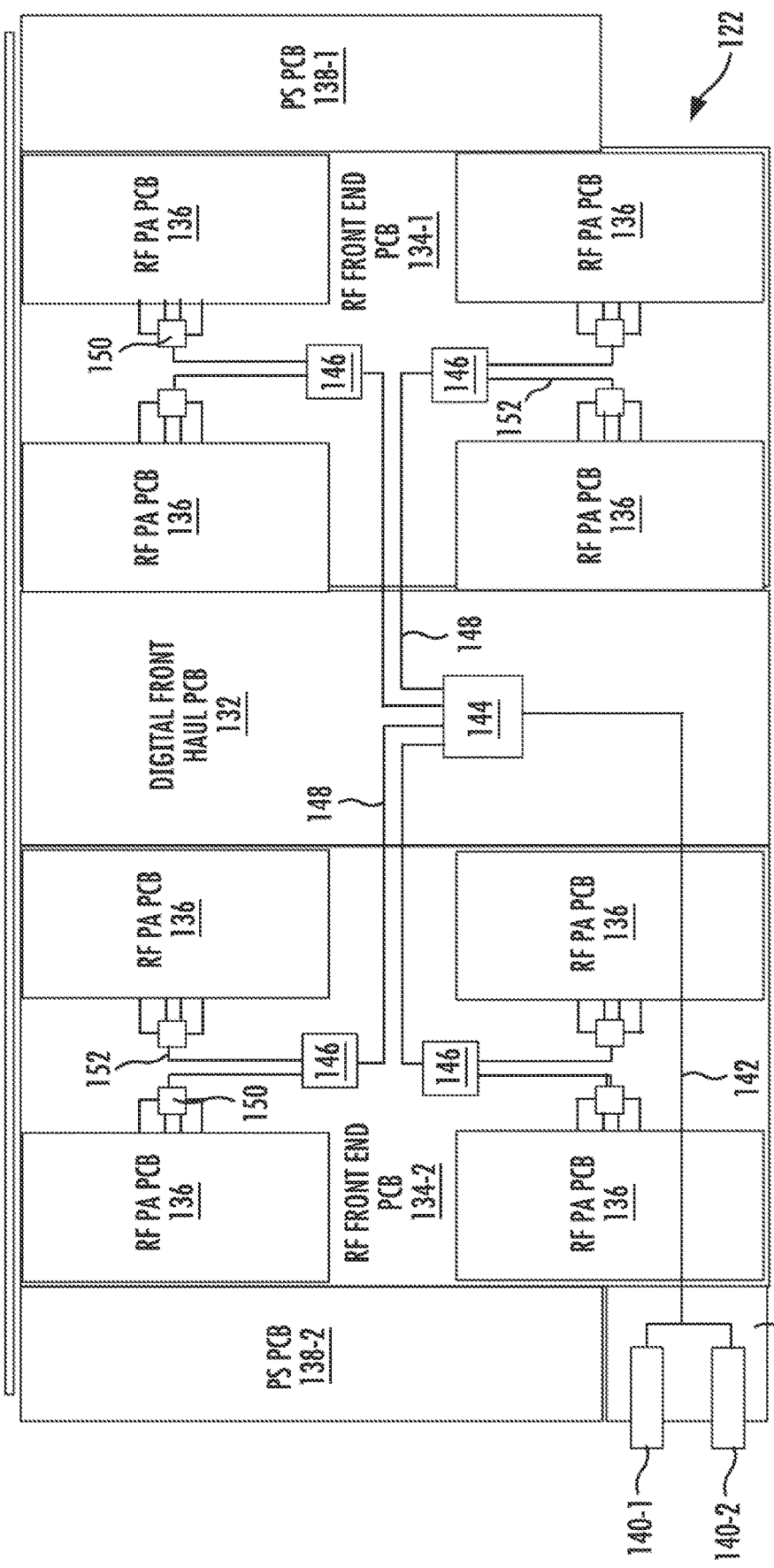
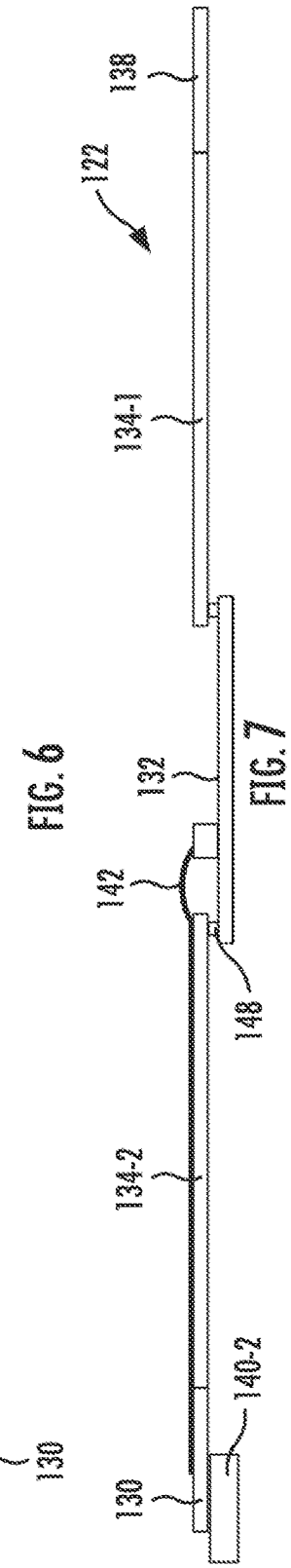
FIG. 6
FIG. 7

SYSTEMS AND METHODS FOR
GENERATING CALIBRATION DATA IN
ACTIVE ANTENNA MODULES HAVING
ANTENNA-SIDE FILTER ARRAYS THEREIN

REFERENCE TO PRIORITY APPLICATIONS

The present application is a 35 U.S.C. § 371 national stage application of PCT Application No. PCT/US2022/032149, filed on Jun. 3, 2022, which itself claims priority to Italian Application No. 102021000014927, filed Jun. 8, 2021, the entire contents of both of which are incorporated herein by reference.

FIELD

The present invention relates to cellular communications systems and, more particularly to base station antennas having active antenna modules.

BACKGROUND

Cellular communications systems are well known in the art. In a cellular communications system, a geographic area is divided into a series of regions that are referred to as "cells" which are served by respective base stations. Each base station may include one or more base station antennas that are configured to provide two-way radio frequency ("RF") communications with mobile subscribers that are within the cell served by the base station. In many cases, each base station is divided into "sectors." In perhaps the most common configuration, a hexagonally shaped-cell is divided into three 120° sectors, and each sector is served by one or more base station antennas. Typically, the base station antennas are mounted on a tower or other raised structure, with the radiation patterns (also referred to herein as "antenna beams") that are generated by the base station antennas directed outwardly. Base station antennas are often implemented as linear or planar phased arrays of radiating elements.

With the introduction of fifth generation ("5G") cellular technologies, base station antennas are now routinely being deployed that have active beamforming capabilities. Active beamforming refers to transmitting RF signals through a multi-column array of radiating elements in which the relative amplitudes and phases of the sub-components of an RF signal that are transmitted (or received) through the different radiating elements of the array are adjusted, so that radiation patterns formed by individual radiating elements constructively combine in one or more desired directions to form narrower antenna beams having higher gain. With active beamforming, the shape and pointing direction of the antenna beams generated by the multi-column array may, for example, be changed on a time slot-by-time slot basis of a time division duplex ("TDD") multiple access scheme. Moreover, different antenna beams can be generated simultaneously on the same frequency resource in a multi-user MIMO scenario. More sophisticated active beamforming schemes can apply different beams to different physical resource blocks, which are a combination of time and frequency resources, by applying the beam vector in the digital domain. Base station antennas that have active beamforming capabilities are often referred to as active antennas. When the multi-column array includes a large number of columns of radiating elements (e.g., sixteen or more), the array is often referred to as a massive MIMO array. A module that includes a multi-column array of radiating elements and associated RF circuitry (and perhaps baseband circuitry) that implement an active antenna is referred to herein as an active antenna module. Active antenna modules may be deployed as standalone base station antennas, or may be deployed in larger antenna structures that include additional active antenna modules and/or conventional "passive" antenna arrays that are connected to radios that are external to the antenna structures.

SUMMARY

An active antenna module according to an embodiment of the invention supports enhanced calibration of an active antenna system (AAS) radio therein, which utilizes antenna-side filter arrays within the multi-channel transmit/receive signal path of the module. In particular, the AAS radio may include an array of directional couplers within the multi-channel transmit/receive signal path, along with a "calibration" combiner network, which is electrically coupled to the array of directional couplers. In addition, an array of filters is provided within the transmit/receive signal path, but the array of filters is electrically coupled to antenna-side terminals of the array of directional couplers, and not their transmitter-side terminals. A plurality of pairs of transmitters and receivers are provided, which include a transmitter and receiver that operate as a reference transmitter and a reference receiver during calibration of the AAS radio. A multi-stage switch network is provided, which is electrically coupled to the reference transmitter, the reference receiver, and the combiner network, etc.

According to some of these embodiments of the invention, a first output port of the multi-stage switch network is electrically coupled to a factory calibration port of the AAS radio, and a second output port of the multi-stage switch network is electrically coupled to a board-to-board connection port of the AAS radio. In addition, an output terminal of the reference transmitter is electrically coupled to a first terminal of a first switch within the multi-stage switch network, and an input terminal of a power amplifier (PA) associated with the reference transmitter is electrically coupled to a second terminal of the first switch. Similarly, an input of the reference receiver is electrically coupled to a first terminal of a second switch within the multi-stage switch network, and a second terminal of the second switch is electrically coupled to an output terminal of a low noise amplifier (LNA) associated with the reference receiver.

According to further embodiments of the invention, a system for generating calibration data in an active antenna system (AAS) radio includes an array of directional couplers within a multi-channel transmit/receive signal path of the AAS radio, and a combiner network electrically coupled to the array of directional couplers. An array of filters is also provided within the multi-channel transmit/receive signal path. The array of filters is electrically coupled to antenna-side terminals of the array of directional couplers. A plurality of pairs of transmitters and receivers are provided, which include a transmitter and a receiver that operate, in dual-function, as a reference transmitter and a reference receiver, respectively, during calibration. A routing network is also provided, which is electrically coupled to antenna-side terminals of the array of filters. Advantageously, the routing network is configured to feed back factory calibration signals (generated by the AAS radio during factory calibration) to antenna-side terminals of the array of filters. An enhanced multi-stage switch network is also provided, which is electrically coupled to the reference transmitter, the reference receiver, the combiner network, and a factory calibration port of the routing network. In particular, the multi-stage switch network may include a switch electrically coupled to the reference transmitter, a switch electrically coupled to the reference receiver, a switch electrically coupled to the combiner network, and a switch electrically coupled to the factory calibration port of the routing network. In some of these embodiments of the invention, the routing network may be a removable routing network, which is configured to support the factory calibration of the AAS radio by selectively routing the factory calibration signals received at the factory calibration port to the antenna-side terminals of the array of filters. Moreover, in the event the array of directional couplers, the combiner network, and multi-stage switch network are configured on a front end printed circuit board (PCB), then the multi-stage switch network may include an additional switch that is electrically coupled to a board-to-board port of the front end PCB, in order to enable calibration of additional portions of transmit/receive signal paths of the AAS radio.

According to still further embodiments of the invention, a method of generating calibration data in an active antenna system (AAS) radio is provided, which includes: (i) transmitting first calibration signals through a plurality of first calibration loops, which include respective filters within a multi-channel transmit/receive signal path of the AAS radio, (ii) transmitting second calibration signals through a plurality of second calibration loops, which include respective in-line directional couplers and respective portions of a combiner network on a transmit side of the filters within the AAS radio (but do not include the filters), and (iii) transmitting third calibration signals through a plurality of third calibration loops, which include respective ones of the in-line directional couplers and respective portions of the combiner network on the transmit side of the filters (but do not include the filters), and terminate at a reference receiver within the AAS radio. In some of these embodiments, the first calibration signals and the second calibration signals are transmitted through the first and second pluralities of calibration loops by a reference transmitter within the AAS radio. In addition, the third calibration signals are transmitted through the plurality of third calibration loops by respective ones of a corresponding plurality of transmitters within the AAS radio.

Moreover, in the event the AAS radio includes a multi-stage switch network, which is electrically coupled to the reference transmitter and the reference receiver to thereby support calibration, then each of the first, second and third calibration loops may pass through respective portions of the multi-stage switch network. A $1:2^N$ routing network may also be provided, which is electrically coupled to the multi-stage switch network during the transmitting of first calibration signals through the plurality of first calibration loops; and this $1:2^N$ routing network may be electrically coupled to antenna-side terminals of the filters during the transmission of first calibration signals through the plurality of first calibration loops.

In additional embodiments of the invention, a method of operating an active antenna system (AAS) includes: (i) generating factory calibration data using a removable routing network, which feeds back factory calibration signals to antenna-side terminals of a filter array within a multi-channel transmit/receive signal path of the AAS radio, then (ii) removing the routing network from the antenna-side terminals of the filter array, then (iii) attaching an antenna to the multi-channel transmit/receive signal path of the AAS, and then (iv) generating field calibration data for the AAS. In some of these embodiments, the generation of the factory calibration data may include transmitting first calibration signals through each of a plurality of first calibration loops, which include respective portions of the removable routing network, and transmitting second calibration signals through each of a plurality of second calibration loops, which include respective in-line directional couplers and respective portions of a combiner network on a transmit side of the filter array within the AAS. In addition, the generating of field calibration data may include transmitting third calibration signals through each of a plurality of third calibration loops, which include respective ones of the in-line directional couplers and respective portions of the combiner network on the transmit side of the filter array, and terminate at a reference receiver within the AAS. The factory calibration data and the field calibration data may be generated across multiple frequencies within the frequency band, to thereby enable complete calibration of the AAS radio in a desired application.

BRIEF DESCRIPTION OF THE DRAWINGS

FIGS. 1A and 1B are perspective front and back views, respectively, of an active antenna module that may include filter units having spring-biased interface contacts according to embodiments of the present invention.

FIGS. 2A and 2B are perspective front and back views, respectively, of the active antenna module of FIGS. 1A-1B partially slid into place within a larger passive base station antenna.

FIG. 6 is a schematic front view of the active circuit layer included in the active antenna module of FIG. 4.

FIG. 7 is a schematic side view of the active circuit layer included in the active antenna module of FIG. 4.

DETAILED DESCRIPTION

Figure 3A:
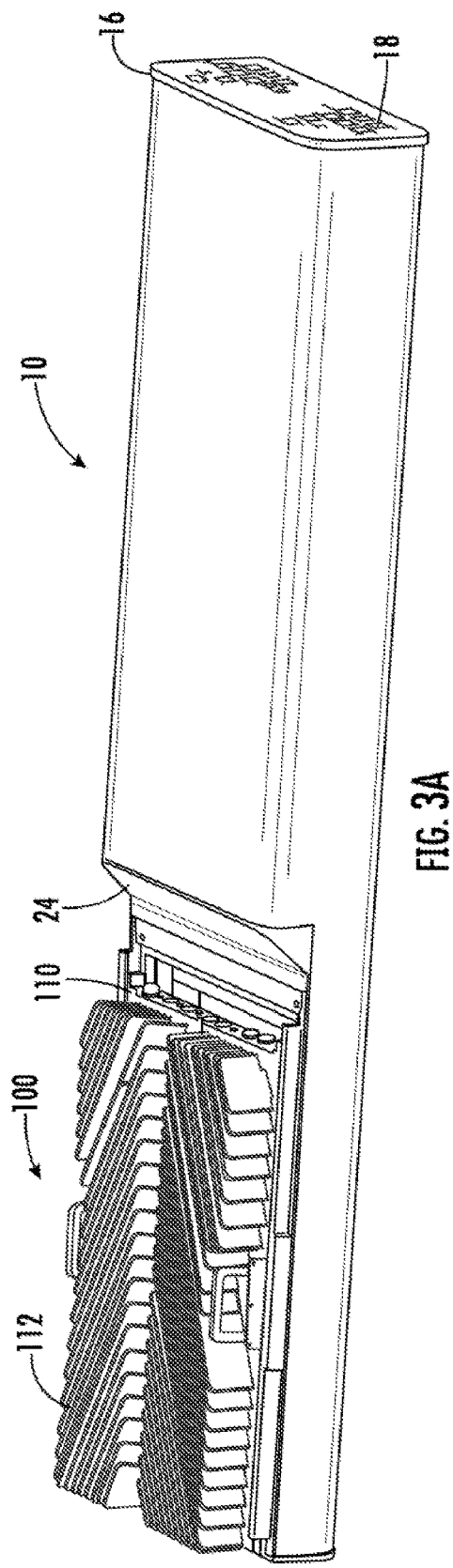
FIG. 3A is a perspective back view of the passive base station antenna of FIGS. 2A-2B with the active antenna module fully installed therein.

Pursuant to embodiments of the present invention, a system for generating calibration data in an active antenna module (AAM) that supports 5G cellular communications includes an array of directional couplers within a multi-channel transmit/receive signal path of an active antenna system (AAS) radio within the AAM, and a combiner network electrically coupled to the array of directional couplers. An array of filters is also provided within the multi-channel transmit/receive signal path. The array of filters is also electrically coupled to antenna-side terminals of the array of directional couplers. A plurality of pairs of transmitters and receivers are provided, which include a transmitter and a receiver that operate, in dual-function, as a reference transmitter and a reference receiver, respectively. Advantageously, a removable routing network is provided, which is electrically coupled to antenna-side terminals of the array of filters. This routing network is configured to feed back factory calibration signals (generated by the AAS radio during factory calibration) to antenna-side terminals of the array of filters. A multi-stage switch network is provided, which is electrically coupled to the reference transmitter, the reference receiver, the combiner network, and a factory calibration port of the routing network. This multi-stage switch network is configured to support full calibration of the AAS radio, without significantly interfering with the transmit/receive signal path therein. Before discussing the system for generating calibration data according to embodiments of the invention, an example active antenna module in which this system may be used will be discussed in greater detail.

FIGS. 1A and 1B are perspective front and back views, respectively, of an active antenna module 100. As shown in FIGS. 1A and 1B, the active antenna module 100 includes a housing 110 and an outer radome 192. The housing 110 may include heat fins 112 that are used to dissipate heat generated by active circuit components that are mounted within the housing 110. The housing 110 with heat fins 112 forms the rear side of the active antenna module 100. The radome 192 may be formed of a dielectric material that is substantially transparent to RF radiation in the operating frequency band of the active antenna module 100. The radome 192 may be mounted forwardly of the housing 110 and may cover and protect a multi-column array of radiating elements that is included in the active module 100.

The active antenna module 100 may be used as a stand-alone antenna. When used in this fashion, the active antenna module 100 may be mounted on a raised structure with the radiating elements thereof pointing outwardly so that they can form antenna beams in the direction of the intended coverage area for the active antenna module 100. A pair of fiber optic cables may extend between the active antenna module 100 and a baseband unit (not shown).

The active antenna module may alternatively be integrated into a larger "passive" base station antenna. A passive base station antenna refers to a base station antenna that includes one or more arrays of radiating elements that generate relatively static antenna beams. Passive base station antennas include RF connectors or "ports" that are connected to external radios.

FIGS. 2A and 2B are perspective front and back views, respectively, of the active antenna module 100 of FIGS. 1A-1B partially slid into place within a larger passive base station antenna 10. The passive base station antenna 10 may comprise an elongated structure that extends along a longitudinal axis L. The passive base station antenna 10 includes a radome 12 and a first top end cap 14. The passive base station antenna 10 also includes a bottom end cap 16 which includes a plurality of RF ports 18 (FIGS. 3A-3B) mounted therein. The RF ports 18 are connected to external radios (not shown) that are connected to the arrays of radiating elements of the passive base station antenna 10. The passive base station antenna 10 is typically mounted in a vertical configuration (i.e., the longitudinal axis L may be generally perpendicular to a plane defined by the horizon when the passive base station antenna 10 is mounted for normal operation).

The depth of the upper portion 22 of the passive base station antenna 10 is less than the lower portion 20 of the passive base station antenna 10. The rear side of the upper portion 22 of the passive base station antenna 10 is recessed. This allows the active antenna module 100 to be pushed or slid into place and secured to the upper rear side of the passive base station antenna 10. The lower portion 20 of the passive base station antenna 10 includes a second top end cap 24.

Figure 3B:
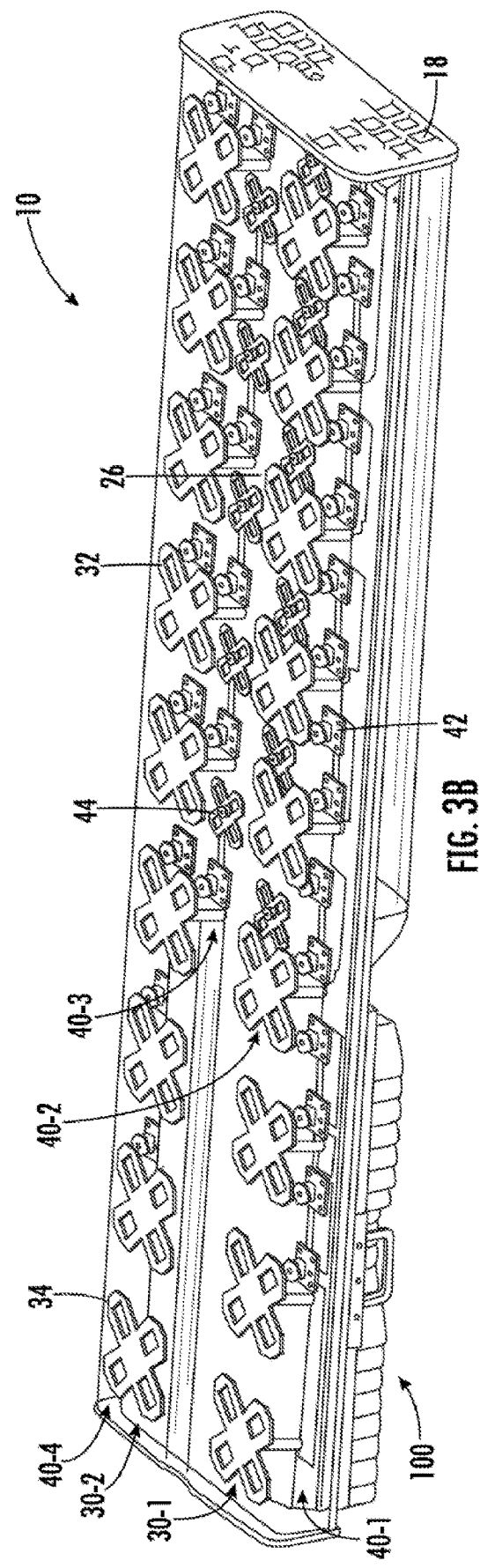
FIG. 3B is a shadow perspective front view of the antenna of FIGS. 2A-2B that schematically illustrates the linear arrays of radiating elements included in the passive base station antenna.

FIG. 3A is a rear perspective view of the passive base station antenna 10 with the active antenna module 100 fully integrated therein. FIG. 3B is a shadow perspective front view of the passive base station antenna 10 with the active antenna module 100 integrated therein that schematically illustrates the linear arrays of radiating elements included in the passive base station antenna 10. As shown in FIG. 3B, the passive base station antenna 10 includes one or more reflectors 26. Various components of the passive antenna 10 may be mounted behind the lower portion of the reflector 26, such as remote electronic tilt units, phase shifters, diplexers, controllers and the like (not shown). A pair of linear arrays 30-1, 30-2 of low-band radiating elements 32, 34 and four linear arrays 40-1 through 40-4 of mid-band radiating elements 42, 44 are mounted to extend forwardly from the reflector 26. The low-band radiating elements 32, 34 may comprise slant −45°/+45° cross dipole radiating elements that are configured to transmit and receive RF signals in all or part of the 617-960 MHz frequency range. The low-band radiating elements 34 differ from the low-band radiating elements 32 in that they have slanted feed stalks so that the active antenna module 100 can fit in between the two low-band linear arrays 30-1, 30-2.

The mid-band radiating elements 42, 44 may also comprise slant −45°/+45° cross dipole radiating elements that are configured to transmit and receive RF signals in all or part of the 1427-2690 MHz frequency range. In the depicted embodiment, the outer mid-band linear arrays 40-1 and 40-4 include mid-band radiating elements 42 that are configured to transmit and receive RF signals in the 1695-2690 MHz frequency range (or, alternatively, the 1427-2690 MHz frequency range), while the inner mid-band linear arrays 40-2 and 40-3 include mid-band radiating elements 44 that are configured to transmit and receive RF signals in the full 1427-2690 MHz frequency range. The radiating elements of the active antenna module 100 are not shown in FIG. 3B to simplify the drawing.

Passive base station antennas that are designed for use with integrated active antenna modules are discussed in detail in U.S. patent application Ser. No. 17/209,562 ("the '562 application"), the entire content of which is incorporated herein by reference. The passive base station antenna 10 and the active antenna module 100 may have the mechanical designs of any of the passive base station antennas and active antenna modules disclosed in the above-referenced '562 application.

Figure 4:
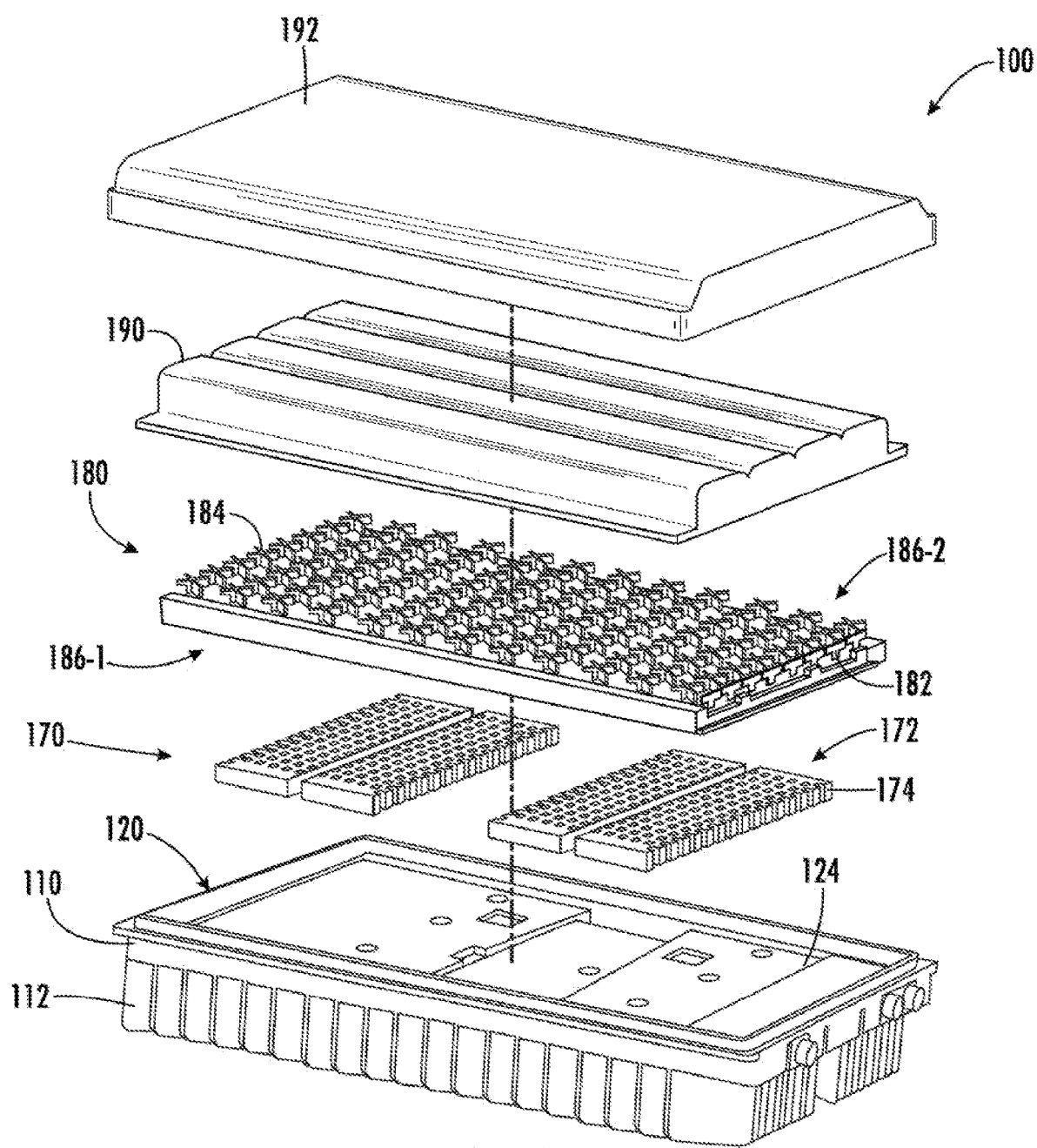
FIG. 4 is an exploded perspective view of the active antenna module of FIGS. 1A-1B.

FIG. 4 is an exploded schematic perspective view of the active antenna module 100. As shown in FIG. 4, the rearmost portion of the active antenna module 100 is the housing 110 having heat fins 112. The housing 110 may comprise a metal frame and the heat fins 112 may be formed integrally with the housing 110. The bottom surface of the housing 110 and the heat fins act as a heat sink. Heat spreading structures (not shown), such as vapor chambers, heat pipes or any other high thermal conductivity material, structure or assembly, may also be mounted in the housing 110 adjacent regions where high heat density occurs during device operation. The heat spreading structures may facilitate spreading heat from a small area (e.g., the area behind active circuits in the active circuit layer 120) to a much larger area so that the heat may be vented from the active antenna module 100 through the heat fins 112.

An "active circuit layer" 120 is mounted forwardly of the heat spreading structures. The active circuit layer 120 may comprise a printed circuit board structure 122 (not visible in FIG. 4, but shown in FIGS. 5 and 7A-7B) and an EMI shield 124 that covers and protects the printed circuit board structure 122. The printed circuit board structure 122 may include multiple printed circuit boards that have processors as well as baseband and RF circuit components mounted thereon such as field programmable gate arrays (FPGAs), amplifiers, oscillators, switches, circulators, up-converters, down-converters and the like. The EMI shield 124 may include a metal (e.g., aluminum) structure that may be formed by, for example, die casting. The EMI shield 124 shields the circuits and transmission lines in the active circuit layer 120 from RF radiation from external sources, and prevents RF energy radiated from the active circuit layer 120 from impacting other circuits/elements in the active antenna module 100 or the passive antenna 10. Electrical connections may extend through the EMI shield 124 to facilitate connecting circuit elements in the active circuit layer 120 to the filter layer 170. The active circuit layer 120 will be described in greater detail below with reference to FIGS. 5 and 7A-7B. Various of the processors and baseband/RF circuit components may generate significant amounts of heat. By providing vapor chambers or other heat spreading structures directly behind the highest heat generating circuits of the active circuit layer 120, the heat generated by such circuits may be more efficiently vented from the active antenna module 100.

A filter layer 170 is mounted forwardly of the active circuit layer 120. The filter layer 170 includes a plurality of RF filters 174. The RF filters 174 may be formed as filter banks 172 that each include a plurality of RF filters 174 that share a common housing. In the depicted embodiment, a total of four filter banks 172 are provided that each include eight RF filters 174 that are formed in a common housing. Each RF filter 174 may comprise a resonant cavity bandpass filter that is configured to pass RF signals in the operating frequency band of the active antenna module 100. The filters 174 are mounted directly on the EMI shield 124.

An antenna layer 180 is provided forwardly of the filter layer 170. The antenna layer 180 may include a reflector 182 and a plurality of radiating elements 184. The reflector 182 may comprise, for example, a metallic sheet or a frequency selective surface that is designed to reflect RF energy in the operating frequency range of the radiating elements 184 of the active antenna module 100. The radiating elements 184 may comprise, for example, slant −45°/+45° cross dipole radiating elements that are configured to transmit and receive RF signals in the operating frequency range of the active antenna module 100. This operating frequency range may, for example, comprise all or a portion of the 3.1-4.2 GHz frequency range or all or a portion of the 5.1-5.8 GHz frequency range. In an example embodiment, the operating frequency range may be the 3.4-3.8 GHz frequency band. The radiating elements 184 may be arranged in a plurality of rows and columns. In the depicted embodiment, a total of eight columns having twelve radiating elements 184 each are provided. As will be explained below, the upper and lower half of each column are fed by different transceivers so that the active antenna module 100 operates as two separate eight column arrays 186-1, 186-2 of radiating elements 184 that are stacked along the longitudinal axis of the active antenna module 100. As a result, the active antenna module 100 effectively includes sixteen columns of radiating elements 184 (namely two arrays 186 with eight columns each, where each column includes six radiating elements 184). Since the radiating elements 184 are dual-polarized radiating elements, this means that the active antenna module 100 effectively has thirty-two columns of radiators that can simultaneously transmit or receive RF signals.

An inner radome 190 covers and protects the antenna layer 180. An outer radome 192 covers the inner radome 190. The function and operation of the inner and outer radomes 190, 192 are described in more detail in the above-referenced '562 application.

Figure 5:
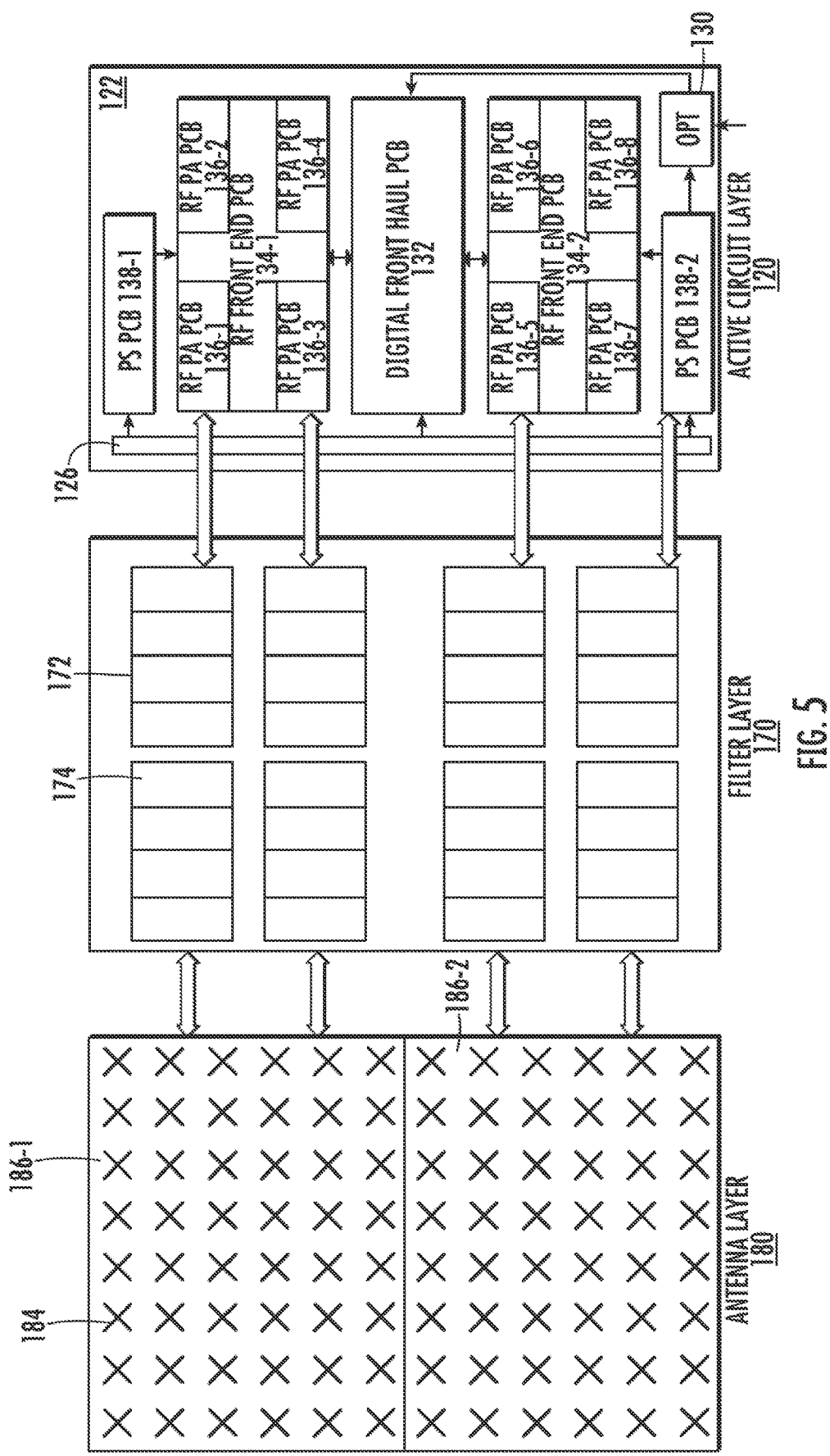
FIG. 5 is a schematic diagram of the active circuit layer, the filter layer and the antenna layer of the active antenna module of FIG. 4.

FIG. 5 is a schematic diagram of the printed circuit board structure 122 of the active circuit layer 120, the filter layer 170 and the antenna layer 180. As shown in FIG. 5, the printed circuit board structure 122 includes an optical interface printed circuit board ("PCB") 130, a digital front haul printed circuit board 132, a pair of RF front end printed circuit boards 134-1, 134-2, and a pair of power supply printed circuit boards 138-1, 138-2. Each RF front end printed circuit board 134 may have a plurality of RF power amplifier ("PA") printed circuit boards 136 mounted thereon. Each RF PA printed circuit board 136 supports four RF channels, and hence a total of eight RF printed circuit boards 136 are provided to support thirty-two channels that are coupled to the respective thirty-two columns of radiators discussed above. The active circuit layer 120 may further include a power bar or other power bus 126. The power bus may connect to each of the power supply printed circuit boards 138 and to the digital front haul printed circuit board 132.

The digital front haul printed circuit board 132 may be mounted in the middle of the heat sink, and may be placed directly on a first of the vapor chambers. The first ("upper") and second ("lower") RF front end printed circuit boards 134-1, 134-2 may be mounted on either side of the digital front haul printed circuit board 132, and may likewise be mounted directly on respective second and third vapor chambers. Four RF PA printed circuit boards 136 are mounted on each RF front end printed circuit boards 134, and may be soldered onto, or press-fit onto, the front surfaces of the RF front end printed circuit boards 134. The digital front haul printed circuit board 132 and the first and second RF front end printed circuit boards 134 may be formed using conventional low cost printed circuit boards formed using FR4 or the like. The RF PA printed circuit boards 136 may be formed using dielectric materials that have low insertion losses for RF signals.

The filter layer 170 includes the above-described banks 172 of resonant cavity filters 174. A total of thirty-two resonant cavity filters 174 are provided, with each resonant cavity filter 174 coupled to a respective one of the transmit/receive chains on the RF PA printed circuit boards 136. As noted above, the filters 174 may be mounted directly on the EMI shield 124 that covers and protects the printed circuit boards of the active circuit layer 120.

First and second resonant cavity filters 174 are coupled to each of the sixteen columns of radiating elements 184, where the first resonant cavity filter 174 is coupled to the slant −45° radiators of the radiating elements 184 in the column, and the second resonant cavity filter 174 is coupled to the slant +45° radiators of the radiating elements 184 in the column.

FIGS. 6 and 7 are schematic front and side views, respectively, of the printed circuit board structure 122 of the active circuit layer 120. As shown in FIG. 7A, a pair of optical connector modules 140-1, 140-2 are provided on the optical interface printed circuit board 130. Each optical connector module 140 may have the same design, with two optical connector modules 140 provided to double the throughput and/or to provide redundancy. Each optical connector module 140 is a bidirectional device that includes a fiber optic connector, an integrated optical-to-electrical converter that converts optical digital baseband data received at the connector modules 140 into an electrical baseband data stream and an integrated electrical-to-optical converter that converts an electrical baseband data stream that is received from the digital front haul printed circuit board 132 into digital optical signals.

A high speed cable assembly 142 connects the first and second optical connectors 140 to a main field programmable gate array ("FPGA") 144 that is mounted on the digital front haul printed circuit board 132. The main FPGA 144 may perform various functions including ORAN processing and digital beamforming. The main FPGA 144 is connected to four secondary FPGAs 146 that are mounted on the RF front end printed circuit boards 134 (two secondary FPGAs 146 are provided per RF front end printed circuit board 134). High-speed board-to-board connectors 148 are used to connect the main FPGA 144 to each of the secondary FPGAs 146. Each secondary FPGA 146 may perform additional processing.

Each secondary FPGA 146 is connected to a pair of RF transceivers 150. Four RF transceivers 150 are located on each of the RF front end printed circuit boards 134, with each RF transceiver 150 being associated with a respective one of the RF PA printed circuit boards 136. Each secondary FPGA is 146 coupled to its associated two RF transceivers 150 by a pair of JESD transmission paths 152.

Each RF transceiver 150 includes a digital-to-analog converter, an I/Q modulator (including a local oscillator) that, for downlink signals, converts an input digital data stream into four RF signals. The RF transceivers 150 likewise include an analog-to-digital converter and an I/Q demodulator that demodulate four RF uplink signals and convert the demodulated data into a digital data stream. Thus, each RF transceiver 150 comprises the front end of four transmit/receive chains. Each RF PA printed circuit board 136 includes the back end of four transmit/receive chains, including filters, high power amplifiers, low noise amplifiers, amplifier predistortion circuitry and transmit/receive path switching. Thus, the eight RF transceivers 150 and the eight RF PA printed circuit boards 136 together form thirty-two transmit/receive chains. The output of each transmit/receive chain may be coupled to a respective one of the filters 174 in the filter layer 170.

FIG. 7 is a schematic side view of the printed circuit board structure 122 of the active circuit layer 120. As shown in FIG. 7, the digital front haul printed circuit board 132 may be offset rearwardly from the two RF front end printed circuit boards 134 so that high-speed board-to-board connectors 148 may be used to connect each RF front end printed circuit board 134 to the digital front haul printed circuit board 132. FIG. 7 also illustrates the high-speed cable assembly 142 that connects the optical connectors 140-1, 140-2 to the digital front haul printed circuit board 132.

Figure 8A:
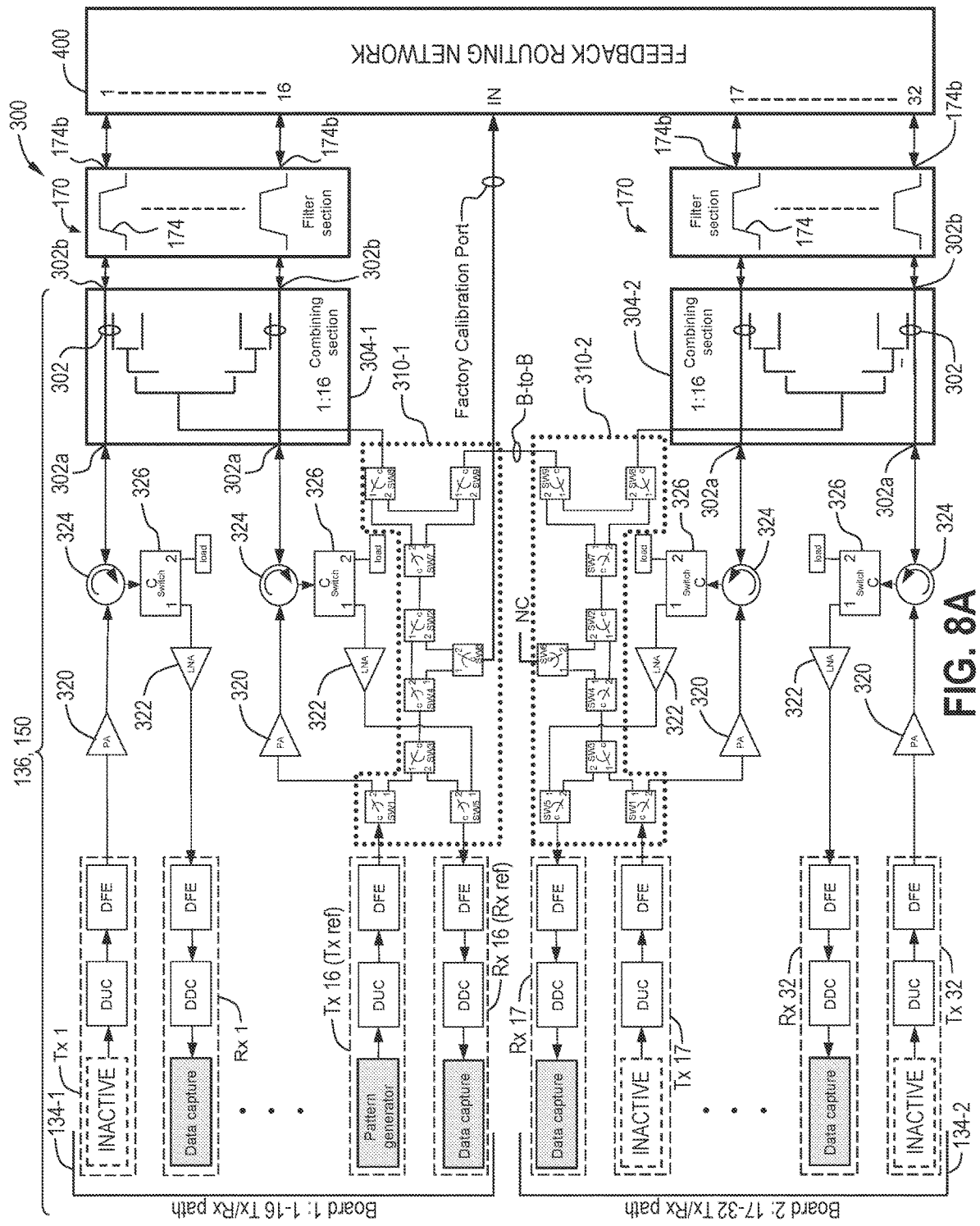
FIGS. 8A-8C are electrical schematics of an active antenna system (AAS) radio, during factory and field calibration thereof.
Figure 8B:
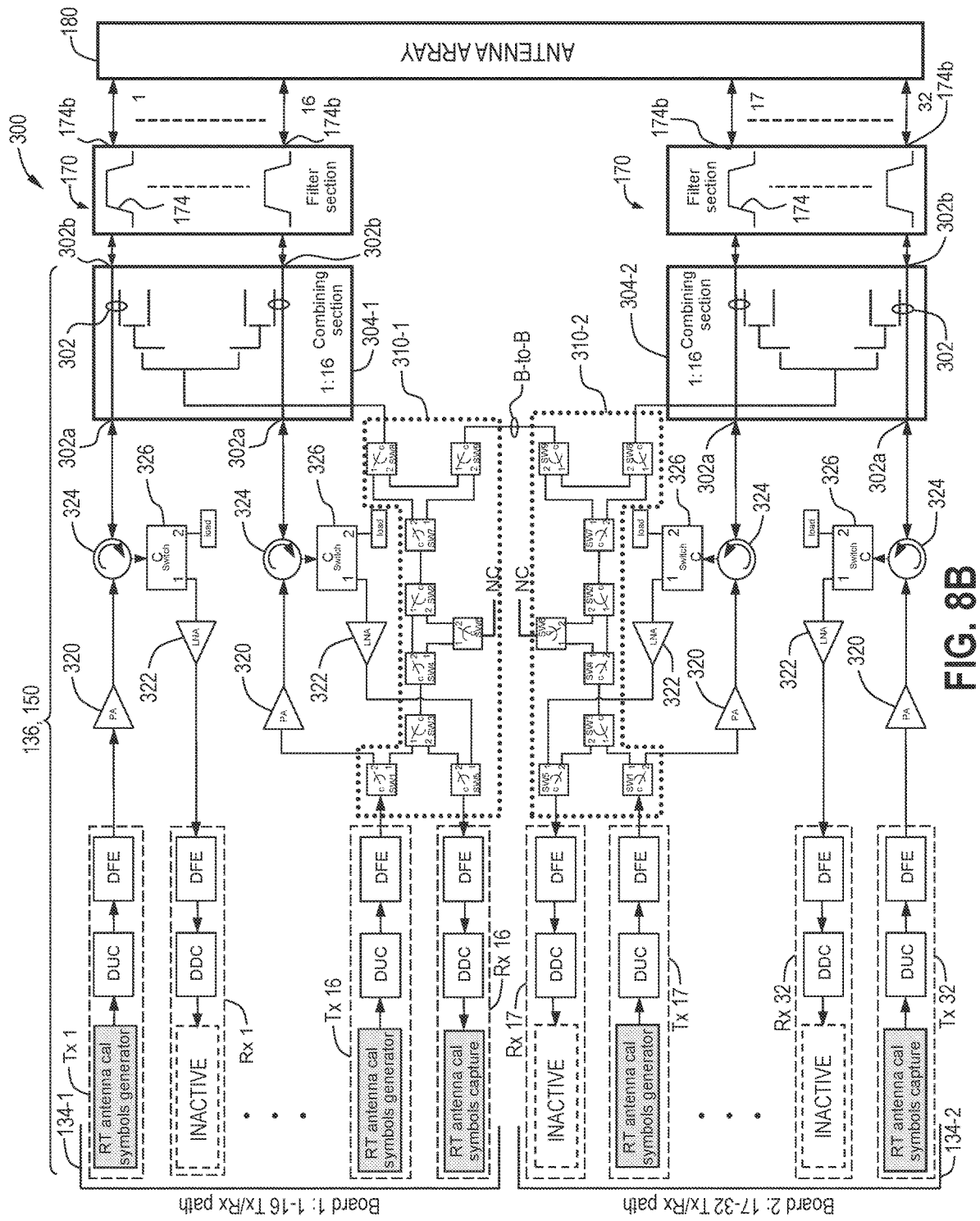
Figure 8C:
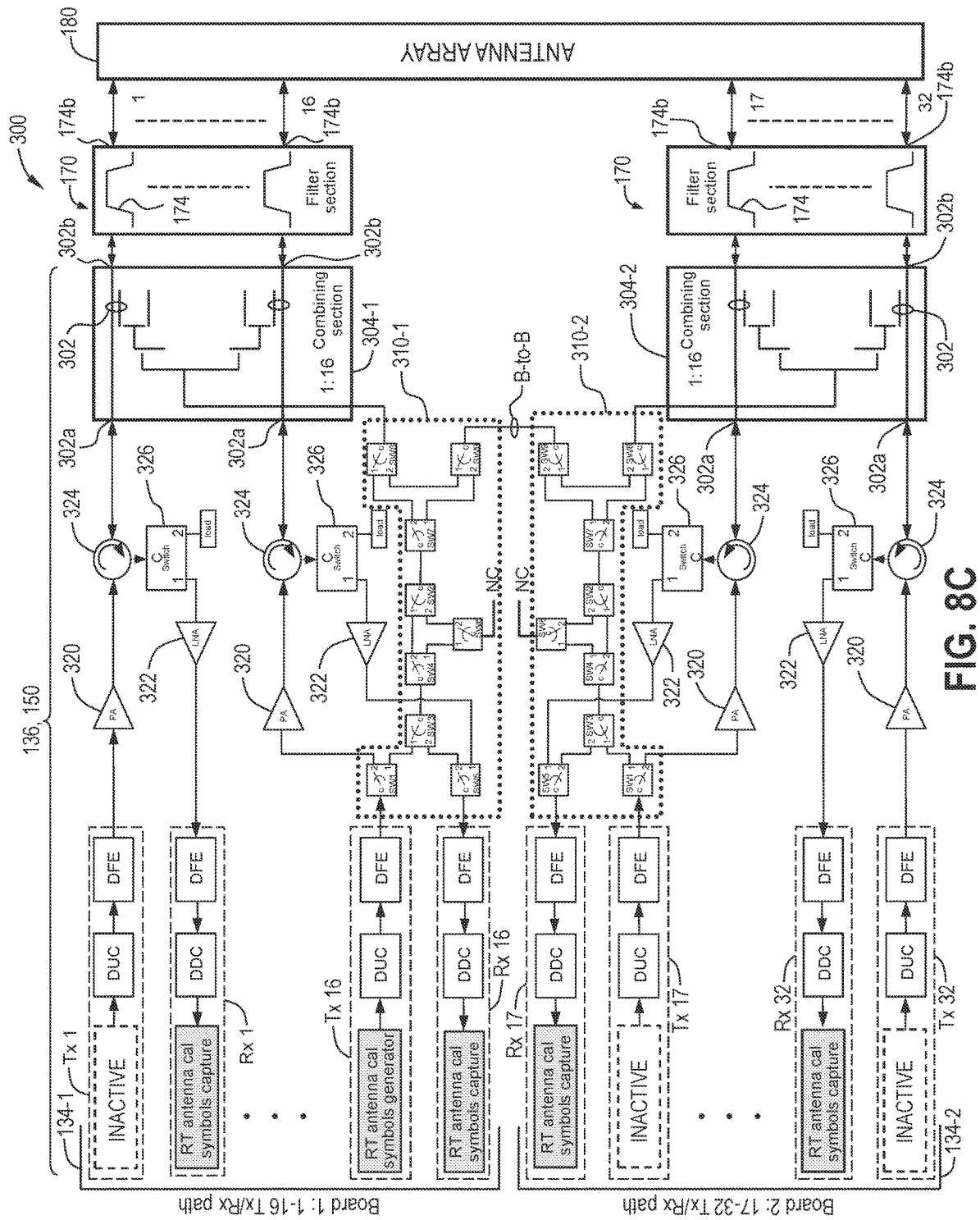

Referring now to FIGS. 8A-8C, a system for generating calibration data in an active antenna module 100 may utilize components described hereinabove with respect to: (i) the filter layer 170, which is described as including thirty two (32) filters 174 arranged into four banks 172, and (ii) the active circuit layer 120 embodied on a printed circuit board structure 122, which includes an upper RF front end board 134-1 and a lower RF front end board 134-2 thereon. As illustrated best by FIGS. 5 and 7A, the active circuit layer 120 includes a combination of eight (8) RF power amplifier (PA) printed circuit boards 136 (having 4 power amplifiers per board) and eight (8) corresponding 4× transceiver modules 150, which collectively support 16 Tx/Rx channels on the upper RF front end board 134-1 and 16 Tx/Rx channels on the lower RF front end board 134-2. Thus, as shown by FIG. 8A, each Tx/Rx channel in the RF front end boards 134-1, 134-2 includes a transmitter TxN having digital up converter (DUC) and digital front end (DFE) circuitry therein, and a receiver RxN having digital down converter (DDC) and digital front end (DFE) circuitry therein, where N is in a range from 1 to 32 for the illustrated embodiment. However, in alternative embodiments, the number of channels may be equivalent to $2^n$, where n is greater than two.

In particular, the system for generating calibration data utilizes first and second arrays of directional couplers 302 within a multi-channel transmit/receive signal path of an active antenna system (AAS) radio 300 within the AAM 100, and respective first and second 1:16 combiner networks 304-1, 304-2, which are electrically coupled between the first and second arrays of directional couplers 302 and respective first and second multi-stage calibration switch networks 310-1, 310-2 on the upper RF front end board 134-1 and the lower RF front end board 134-2. As illustrated, each of these multi-stage calibration switch networks 310-1, 310-2 includes nine (9) calibration switches (SW1-SW9), connected as illustrated, with each switch SWn having one input terminal (c) that can be selectively routed to one of two output terminals (1, 2) in response to switch control signals (not shown), which are generated during calibration and when the AAS radio 300 within the AAM 100 is fully active. However, in alternative embodiments, one or more of these switches may be replaced by power splitter/combiner elements based on different designs and performance tradeoffs of the switch networks 310-1, 310-2.

The system for generating calibration data also utilizes the thirty two (32) filters 174 within the filter layer 170, which are located within the multi-channel transmit/receive signal path of the AAM 100 and electrically coupled to antenna-side terminals 302b of the first and second arrays of directional couplers 302. This electrical coupling of the filter layer 170 to antenna-side terminals 302b is contrary to the customary placement of the filters on the transmitter-side terminals 302a of the directional couplers 302, as disclosed in FIGS. 1B and 2A of U.S. application Ser. No. 17/203,090, entitled: "Base Station Antenna with High Performance Active Antenna System (AAS) Integrated Therein," the disclosure of which is hereby incorporated herein by reference.

As described herein, the transmitter-side terminals 302a and the antenna-side terminals 302b of the directional couplers 302 represent the input and output terminals of the directional couplers, respectively, with the transmitter-side terminal 302a being directly connected to a terminal of a corresponding circulator 324 within the transmit-receive signal path, and the antenna-side terminal 302b being directly connected to a transmitter-side terminal of a corresponding filter 174 within the filter layer 170. Moreover, each directional coupler 302 includes a coupling terminal, which is electrically connected to a corresponding one of 16 "coupler" terminals of a corresponding 1:16 combiner network (e.g., 304-1, 304-2), which includes a "combined" terminal that is electrically connected to a terminal (e.g., output terminal "c" of SW8) of a corresponding switch network (e.g., 310-1, 310-2). Finally, as will be understood by those skilled in the art, each isolation terminal of a coupler 302 may be terminated with a resistor (not shown).

As further shown by FIGS. 8A-8C, the 32 pairs of transmitters and receivers (Tx1-Tx32, Rx1-Rx32) are selectively utilized during the generation of calibration data from various calibration signals that traverse respective calibration loops within the AAS radio 300 (e.g., for multiple frequencies within an operating frequency band (e.g., 3.4 GHz to 3.8 GHZ)). And, these pairs of transmitters and receivers include a transmitter (e.g., Tx16) and a receiver (e.g., Rx16) that may operate, in dual-function, as a reference transmitter and a reference receiver, respectively, during calibration.

As shown by FIG. 8A, the system for generating calibration data further includes a removable routing network 400, which is electrically coupled to: (i) a factory calibration port (i.e., output port) associated with the first multi-stage switch network 310-1, and (ii) 32 antenna-side terminals 174b of the filters 174 within the filter layer 170. Advantageously, this routing network 400 is utilized as a 1-to-32 network to feed back factory calibration signals generated by a reference transmitter, such as Tx16/Txref (or another transmitter depending on printed circuit board layout), to antenna-side terminals 174b of the filters 174 within the filter layer 170. As described herein, these antenna-side terminals 174b are treated as "output" terminals of the filters 174 when the AAS radio 300 is transmitting RF data to the antenna layer 180, and as "input" terminals when the AAS radio 300 is receiving RF data from the antenna layer 180.

In particular, during an initial factory calibration operation, first calibration signals are generated by the reference transmitter Txref (Tx16), which operates as a pattern generator to pass the first calibration signals through switches SW1, SW3, SW4 and SW6 of the first switch network 310-1, and to its factory calibration port, which is electrically coupled (during factory calibration) to an input port (IN) of the routing network 400. Thereafter, the routing network 400 selectively routes the first calibration signals, one-at-a-time, through an "external" calibration loop to each of the antenna-side terminals 174b; however, in alternative embodiments (e.g., ones that support higher power calibration signal generation), the routing network 400 may broadcast the received first calibration signals at the input port (IN) in parallel to all the antenna-side terminals 174b of the filter layer 170 (e.g., so that more time efficient data capture can occur, in parallel, at all receivers Rx1-Rx32), or may broadcast the received first calibration signals to only a subset of all the antenna-side terminals 174b (e.g., 2, 4, 8) before switching to another subset.

Upon receipt by a terminal 174b, the corresponding filter 174 passes the first calibration signals to an antenna-side terminal 302b of a corresponding directional coupler 302 (in the same transmit/receive signal path), which then passes the signals as "received" RF calibration signals to a corresponding receiver RxN (via a corresponding circulator 324, switch 326 and low-noise amplifier (LNA) 322). This receiver RxN then captures the signals as calibration data and terminates the respective calibration loop. This sequence of operations is then repeated, using different configurations of the routing network 400, for each of the receivers RxN on the upper and lower RF front end boards 134-1, 134-2, and for a given RF frequency within an operating frequency band. Thereafter, the same operations may be repeatedly performed to complete a first portion of a factory calibration across multiple frequencies that span the operating frequency band. Moreover, according to further embodiments of the invention, an entirely independent calibration of the routing network 400 may be performed to potentially reduce residual calibration errors caused from path mismatches. And, information relating to this independent calibration may be stored separately in the AAS radio 300 to improve calibration accuracy, or as pre-compensation information that is utilized to support the generation of the factory calibration data.

Referring still to FIG. 8A, a second portion of the factory calibration may include transmitting second calibration signals through a plurality of "internal" calibration loops, which include respective in-line directional couplers 302 and respective portions of the combiner network 304-1, 304-2 that are located on a transmit side of the filter layer 170 within the AAS radio 300, but do not include passing through filters 174 within the filter layer 170. In particular, during the second portion of the factory calibration operation, second calibration signals are generated by the reference transmitter Txref (Tx16), which operates as a pattern generator to selectively pass the second calibration signals through switches SW1, SW3, SW4, SW2, SW7 and SW8 of the first switch network 310-1 for loops terminating at Rx1-Rx16, or the series combination of: (i) switches SW1, SW3, SW4, SW2, SW7 and SW9 (of the first switch network 310-1), (ii) a board-to-board connector (B-to-B), and (iii) switches SW9, SW8 of the second switch network 310-2 for loops terminating at Rx17-Rx32.

Thereafter, for loops terminating at Rx1-Rx16, the second calibration signals pass into the first 1:16 combiner network 304-1, where they are distributed evenly to sixteen (16) coupling ports of the directional couplers 302 and cause the generation of substantially reduced-power "return" calibration signals at the transmitter side "input" terminals 302a of the couplers 302, which are electrically connected to terminals of corresponding circulators 324, as shown. These "return" calibration signals are then passed, in parallel, as "received" RF calibration signals to corresponding ones of the receivers Rx1-Rx16 (in series via a corresponding circulator 324, switch 326 and low-noise amplifier (LNA) 322), which then capture the signals as calibration data and terminate the corresponding 16 calibration loops. Similarly, for loops terminating at Rx17-Rx32, the second calibration signals pass into the second 1:16 combiner network 304-2, where they are distributed evenly to sixteen (16) directional couplers 302 and cause the generation of substantially reduced-power "return" calibration signals at the transmitter side terminals 302a of the couplers 302. These "return" calibration signals are then passed, in parallel, as "received" RF calibration signals to corresponding ones of the receivers Rx17-Rx32 (via a corresponding circulator 324, switch 326 and low-noise amplifier (LNA) 322), which then capture the signals as calibration data and terminate the corresponding 16 calibration loops. This sequence of operations is then repeatedly performed to complete a second portion of the factory calibration across multiple frequencies that span the operating frequency band.

Referring now to FIG. 8B, the AAS radio 300 may undergo "field" calibration by replacing the routing network 400 of FIG. 8A with an antenna layer 180, as described hereinabove, to thereby provide a complete active antenna module (AAM) 100 for calibration. As will now be explained, third calibration signals may be provided through a plurality of third calibration loops, which start at respective transmitters Tx1-Tx32, include respective ones of the in-line directional couplers 302 and respective portions of the combiner network 304-1, 304-2 on the transmit side of the filter layer 170, and terminate at a single reference receiver, such as Rx16/Rxref (or another receiver depending on printed circuit board layout), within the AAS radio 300.

In particular, the first transmitter Tx1 may operate as a real time (RT) antenna calibration symbols generator to pass calibration signals through a corresponding power amplifier (PA) 320 and circulator 324 to a "transmitter side" input port of a corresponding directional coupler 302 within the first combiner network 304-1. As will be understood by those skilled in the art, a portion of the calibration signals received by the directional coupler 302 will be redirected via its coupling port and the first combiner network 304-1 to an input terminal of switch SW8 within the first switch network 310-1, and then in series through switches SW7, SW2, SW4, SW3 and SW5 of the same network 310-1, and then to capture by the reference receiver Rx16/Rxref (to complete a calibration loop). Advantageously, the calibration signals generated by the real time (RT) antenna calibration symbols generator are wideband signals of a particular "radio-tuned" bandwidth (e.g., 100 MHZ) within a larger frequency band (e.g., 3.4 GHz to 3.8 GHZ).

These same operations will then be repeated for transmitters Tx2-Tx16 on the upper RF front end board 134-1; however, based on the configuration of the first switch network 310-1, the calibration signals generated by Tx16 will also pass through switch SW1 (and thereby experience an additional phase delay) before being received by the corresponding PA 320. Likewise, with respect to transmitters Tx17-Tx32 on the lower RF front end board 134-2, analogous calibration loops will be traversed. However, the second combiner network 304-2 will ultimately redirect the calibration signals to switch SW8 of the second switch network 310-2, which will then pass the signals to switch SW9, followed by the board-to-board connector (B-to-B), and then finally in series through switches SW9, SW7, SW2, SW4, SW3 and SW5 of the first switch network 310-1, and then to capture by the reference receiver Rx16/Rxref (to complete a calibration loop). Also, during these operations, the output terminals of SW6 in the first and second switch networks 310-2 remain as open circuits (NC).

Referring now to FIG. 8C, a second portion of the field calibration may include transmitting fourth calibration signals through a plurality of calibration loops, which include respective in-line directional couplers 302 and respective portions of the combiner network 304-1, 304-2 that are located on a transmit side of the filter layer 170 within the AAS radio 300, but do not include passing through filters 174 within the filter layer 170. In particular, during the second portion of the field (e.g., on-site) calibration operation, fourth calibration signals are generated by the reference transmitter Txref (Tx16), which operates as a real-time (RT) symbol generator (e.g., 100 MHz wideband symbol generator) to selectively pass the fourth calibration signals through switches SW1, SW3, SW4, SW2, SW7 and SW8 of the first switch network 310-1 for loops terminating at Rx1-Rx16, or the series combination of: (i) switches SW1, SW3, SW4, SW2, SW7 and SW9 (of the first switch network 310-1), (ii) a board-to-board connector (B-to-B), and (iii) switches SW9, SW8 of the second switch network 310-2 for loops terminating at Rx17-Rx32.

Thereafter, for loops terminating at Rx1-Rx16, the fourth calibration signals pass into the first 1:16 combiner network 304-1, where they are distributed evenly to sixteen (16) coupling ports of the directional couplers 302 and cause the generation of substantially reduced-power "return" calibration signals at the transmitter side "input" terminals 302a of the couplers 302, which are electrically connected to terminals of corresponding circulators 324, as shown. These "return" calibration signals are then passed, in parallel, as "received" RF calibration signals to corresponding ones of the receivers Rx1-Rx16 (in series via a corresponding circulator 324, switch 326 and low-noise amplifier (LNA) 322), which then capture the signals as calibration data and terminate the corresponding 16 calibration loops. Similarly, for loops terminating at Rx17-Rx32, the fourth calibration signals pass into the second 1:16 combiner network 304-2, where they are distributed evenly to sixteen (16) directional couplers 302 and cause the generation of substantially reduced-power "return" calibration signals at the transmitter side terminals 302a of the couplers 302. These "return" calibration signals are then passed, in parallel, as "received" RF calibration signals to corresponding ones of the receivers Rx17-Rx32 (via a corresponding circulator 324, switch 326 and low-noise amplifier (LNA) 322), which then capture the signals as calibration data and terminate the corresponding 16 calibration loops.

Finally, as described herein, the multi-channel transmit signal path is defined as including transmit signal path and a receive signal path for each of the N=32 channels, where each: (i) transmit signal path starts at a respective transmitter TxN and passes, in series, through a corresponding PA 320, circulator 324, coupler 302, and filter 174, and terminates at the antenna layer 180, and each (ii) receive signal path starts at the antenna layer 180 and passes, in series, through a corresponding filter 174, coupler 302, circulator 324, switch 326, and LNA 322, and terminates at a respective receiver RxN. In addition, the descriptor "transmit side" refers to a side of a component that is closer, in its electrical path, to a corresponding transmitter TxN, relative to another side of the component (in the same electrical path); and the descriptor "antenna side" refers to a side of a component that is closer, in its electrical path, to the antenna layer 180, relative to another side of the component (in the same electrical path). Moreover, whereas the calibration signals generated during factory calibration can be similar to the calibration signals generated during on-site/field calibration, the calibration signals generated during factory calibration can be more easily generated continuously for overall calibration for all paths, but without the limitations associated with real-time (RT) signal generation. For example, during on-site/field calibration, there will typically be allocated time slots where a similar signal will be generated (i.e., similar to factory calibration), but it will still be necessary to switch between calibration signals and data traffic signals, so that the overall estimation of all the transmit/receive signal paths can be run in batches for both the Tx and Rx on-site/field calibrations.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed is:

1. A method of generating calibration data in an active antenna system (AAS) radio, comprising:
   transmitting first calibration signals through a plurality of first calibration loops, which include respective filters within a multi-channel transmit/receive signal path of the AAS radio; and
   transmitting second calibration signals through a plurality of second calibration loops, which include respective in-line directional couplers and respective portions of a combiner network on a transmit side of the filters within the AAS radio,
   wherein the first calibration signal and the second calibration signal both pass through a first of the in-line directional couplers.

2. The method of claim 1, further comprising:
   transmitting third calibration signals through a plurality of third calibration loops, which include respective ones of the in-line directional couplers and respective portions of the combiner network on the transmit side of the filters, and terminate at a reference receiver within the AAS radio.

3. The method of claim 2, wherein the first calibration signals and the second calibration signals are transmitted through the first and second pluralities of calibration loops by a reference transmitter within the AAS radio.

4. The method of claim 3, wherein the third calibration signals are transmitted through the plurality of third calibration loops by respective ones of a corresponding plurality of transmitters within the AAS radio.

5. The method of claim 4, wherein the AAS radio comprises a multi-stage switch network electrically coupled to the reference transmitter and the reference receiver.

6. The method of claim 5, wherein each of the first, second and third calibration loops pass through respective portions of the multi-stage switch network.

7. The method of claim 6, wherein a $1:2^N$ routing network is electrically coupled to the multi-stage switch network during said transmitting first calibration signals through the plurality of first calibration loops, where N is a positive integer greater than two.

8. The method of claim 7, wherein the $1:2^N$ routing network is electrically coupled to antenna-side terminals of the filters during said transmitting first calibration signals through the plurality of first calibration loops.

9. The method of claim 3, wherein an antenna is electrically coupled to the multi-channel transmit/receive signal path of the AAS radio during said transmitting third calibration signals through the plurality of third calibration loops, but not during said transmitting first and second calibration signals through the plurality of first calibration loops and the plurality of second calibration loops, respectively.

10. A method of operating an active antenna system (AAS), comprising:
generating factory calibration data using a removable routing network, which feeds back factory calibration signals to antenna-side terminals of a filter array within a multi-channel transmit/receive signal path of the AAS radio; then
removing the routing network from the antenna-side terminals of the filter array; then
attaching an antenna to the multi-channel transmit/receive signal path of the AAS; and then
generating field calibration data for the AAS.

11. The method of claim 10, wherein the removable routing network is a $1:2^N$ routing network having an input port electrically couped to a factory calibration port of the AAS radio, where N is a positive integer greater than two.

12. The method of claim 10, wherein generating factory calibration data comprises:
transmitting first calibration signals through each of a plurality of first calibration loops, which include respective portions of the removable routing network; and
transmitting second calibration signals through each of a plurality of second calibration loops, which include respective in-line directional couplers and respective portions of a combiner network on a transmit side of the filter array within the AAS.

13. The method of claim 12, wherein generating field calibration data comprises transmitting third calibration signals through each of a plurality of third calibration loops, which include respective ones of the in-line directional couplers and respective portions of the combiner network on the transmit side of the filter array, and terminate at a reference receiver within the AAS.

14. The method of claim 13, wherein the first calibration signals and the second calibration signals are transmitted by a reference transmitter within the AAS; and wherein the third calibration signals do not pass through the filter array during said transmitting third calibration signals through each of the plurality of third calibration loops.

15. The method of claim 14, wherein the first calibration signals, the second calibration signals, and the third calibration signals are transmitted at a first frequency within a frequency band of an antenna within the AAS.

16. The method of claim 15, wherein the factory calibration data and the field calibration data are generated across multiple frequencies within the frequency band.

17. The method of claim 13, wherein the AAS comprises a multi-stage switch network electrically coupled to the reference transmitter and the reference receiver; and wherein each of the first, second and third calibration loops pass through respective portions of the multi-stage switch network.

18. A method of generating calibration data in an active antenna system (AAS) radio, comprising:
transmitting first calibration signals through a plurality of first calibration loops, which include respective filters and in-line directional couplers within a multi-channel transmit/receive signal path of the AAS radio, with said in-line directional couplers located on a transmit side of the filters within the AAS radio,
wherein a removable routing network is electrically coupled to antenna-side terminals of the filters; and wherein each of the first calibration signals passes, in sequence, through the routing network and to an antenna-side terminal of a respective one of the filters.

19. The method of claim 18, wherein a removable $1:2^N$ routing network is electrically coupled to antenna-side terminals of the filters and to a calibration port of the AAS radio; and wherein each of the first calibration signals passes, in sequence, through the routing network, and then to an antenna-side terminal of a respective one of the filters, and then to a respective in-line coupler, where N is greater than two.

* * * * *